June 2, 1970  G. H. ROBERTSON  3,515,990
APPARATUS FOR OBTAINING THE AMPLITUDE AND PHASE
SPECTRUMS OF A WAVE-FORM

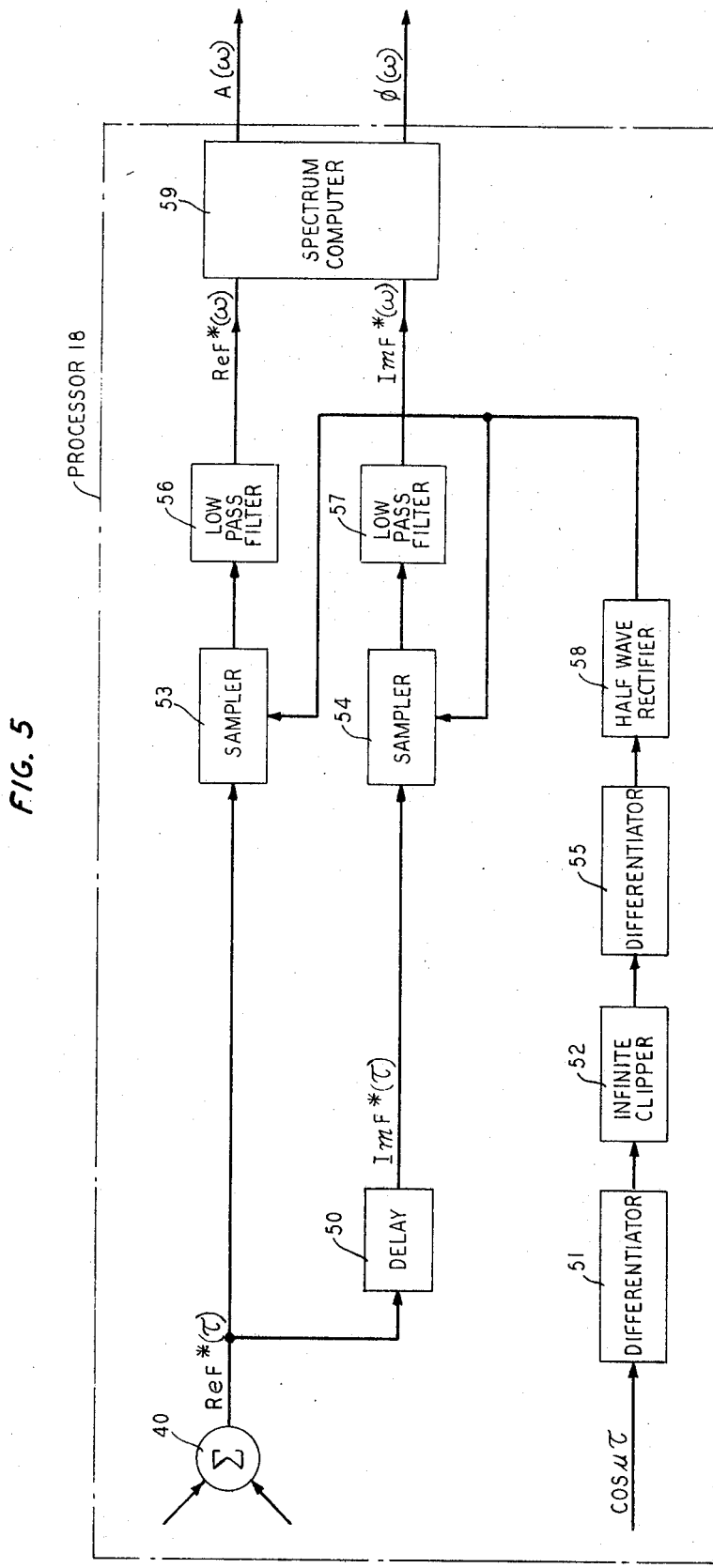

United States Patent Office ──

3,515,990
Patented June 2, 1970

3,515,990
APPARATUS FOR OBTAINING THE AMPLITUDE AND PHASE SPECTRUMS OF A WAVEFORM
George H. Robertson, Summit, N.J., assignor to Bell Telephone Laboratories, Incorporated, Murray Hill and Berkeley Heights, N.J., a corporation of New York
Filed Nov. 30, 1966, Ser. No. 597,947
Int. Cl. G01r 23/16, 27/02
U.S. Cl. 324—77                               16 Claims

ABSTRACT OF THE DISCLOSURE

Samples of a waveform segment to be spectrum analyzed are stored and used to modulate the amplitudes of an equal number of sinusoids selectively spaced in frequency. The instantaneous phases of these sinusoids are such that the output signal produced by summing the modulated sinusoids contains sufficient information to yield both the amplitude and phase spectrums of the waveform segment.

Apparatus is also provided for removing selected large amplitude frequency components of a waveform segment. Upon reanalyzing the modified waveform segment, low amplitude frequency components adjacent to the removed high amplitude frequency components are more easily detected.

Multiplexing apparatus permits one spectrum analyzer to analyze sequentially, in real time, many waveform segments.

BACKGROUND OF THE INVENTION

Prior art spectrum analyzers have been generally of two types: heterodyne sweep analyzers or bandpass filter analyzers. Heterodyne sweep analyzers are inherently slow devices incapable of providing continuous frequency spectrums in real time. Bandpass filter analyzers, on the other hand, produce amplitude spectrums in real time, but in the process of doing so, yield no phase information.

To overcome these limitations of the heterodyne and bandpass filter analyzers, a third type of spectrum analyzer has been developed. This analyzer, exemplified by the system disclosed in Pat. No. 3,344,349, issued to M. R. Schroeder on Sept. 26, 1967, and assigned to Bell Telephone Laboratories, amplitude modulates a set of continuous but uniquely delayed versions of a signal with both sine and cosine waves of selected frequencies. By appropriately choosing the frequencies of these cosine and sine waves, the sum of the modulated cosine waves possesses an amplitude proportional to the real part of the frequency spectrum of the signal, and the sum of the modulated sine waves possesses an amplitude proportional to the imaginary part of this frequency spectrum.

Unfortunately, the resulting frequency spectrum, though in real time, represents only an estimate of the frequency spectrum of the selected signal. Because the delayed versions of the input signal vary continuously with time, an accurate estimate of the frequency spectrum of a precisely defined segment of the input signal can only be approached, never obtained.

SUMMARY OF THE INVENTION

This invention, on the other hand, overcomes this limitation by processing samples of the signal to be analyzed, rather than uniquely delayed continuous versions of this signal. By processing samples, a segment of the signal to be analyzed is "frozen" in time, and an accurate estimate of the frequency spectrum of this segment is obtained. Both amplitude and phase spectrums are obtained with this invention and the accuracy of these spectrums in general exceeds the accuracy of the spectrums obtainable from the prior art analyzers.

Furthermore, because the analysis of a signal segment can be completed quite rapidly, this invention provides a spectrum analysis system capable of analyzing a large number of signals in real time.

According to one embodiment of this invention, samples of a waveform segment to be analyzed are stored and used to modulate the amplitudes of an equal number of cosine waves uniformly spaced in frequency. The instantaneous phases of these cosine waves are such that an output signal produced by summing the modulated cosine waves possesses, at specified times, an amplitude proportional to the real part of the frequency spectrum of the waveform segment. A signal proportional, at these same times, to the imaginary part of the frequency spectrum of this waveform segment is obtained by delaying the output signal a selected amount. By sampling both the delayed and undelayed versions of the output signal at the specified times and processing the resulting samples, continuous time varying waveforms, proportional to the real and imaginary parts of the frequency spectrum of the selected waveform segment, are obtained. The amplitude and phase spectrums of this waveform segment are derived from these time varying waveforms.

Because the rate at which a waveform segment is analyzed can be made quite high, multiplexing apparatus is provided to allow many waveform segments to be analyzed sequentially by one spectrum analysis system.

In an alternative embodiment, the cosine wave signals to be modulated are obtained by filtering the output signal of a pseudonoise generator coded to repetitively produce a so-called maximum length sequence. The spectrum of this type of pseudonoise sequence consists of a set of nearly equal amplitude sine wave components from D.C. to a limit determined by the sequence length and driving rate. Each desired sine wave is tapped off the main output lead by a suitably tuned filter, and adjusted in phase to produce the large number of phase-controlled equal-amplitude cosine wave signals required by this analyzer.

Further, the presence of high amplitude frequency components in a waveform segment often makes it difficult to detect adjacent low amplitude frequency components in the same waveform segment. Apparatus is therefore provided for subtracting out selected high amplitude components from the waveform segment and reanalyzing the modified waveform segment. Low amplitude frequency components adjacent the removed high amplitude components are more easily detected in the reanalysis than in the original analysis. This process can, if desired, be repeated several times, removing frequency components of decreasing amplitude prior to each reprocessing.

This invention may be more fully understood from the following detailed description of preferred embodiments thereof taken together with the following drawings in which:

BRIEF DESCRIPTION OF THE DRAWINGS

FIGS. 5 and 6 are schematic block diagrams of alternative embodiments of processor 18 in FIG. 1.

Theory

Figure 1:
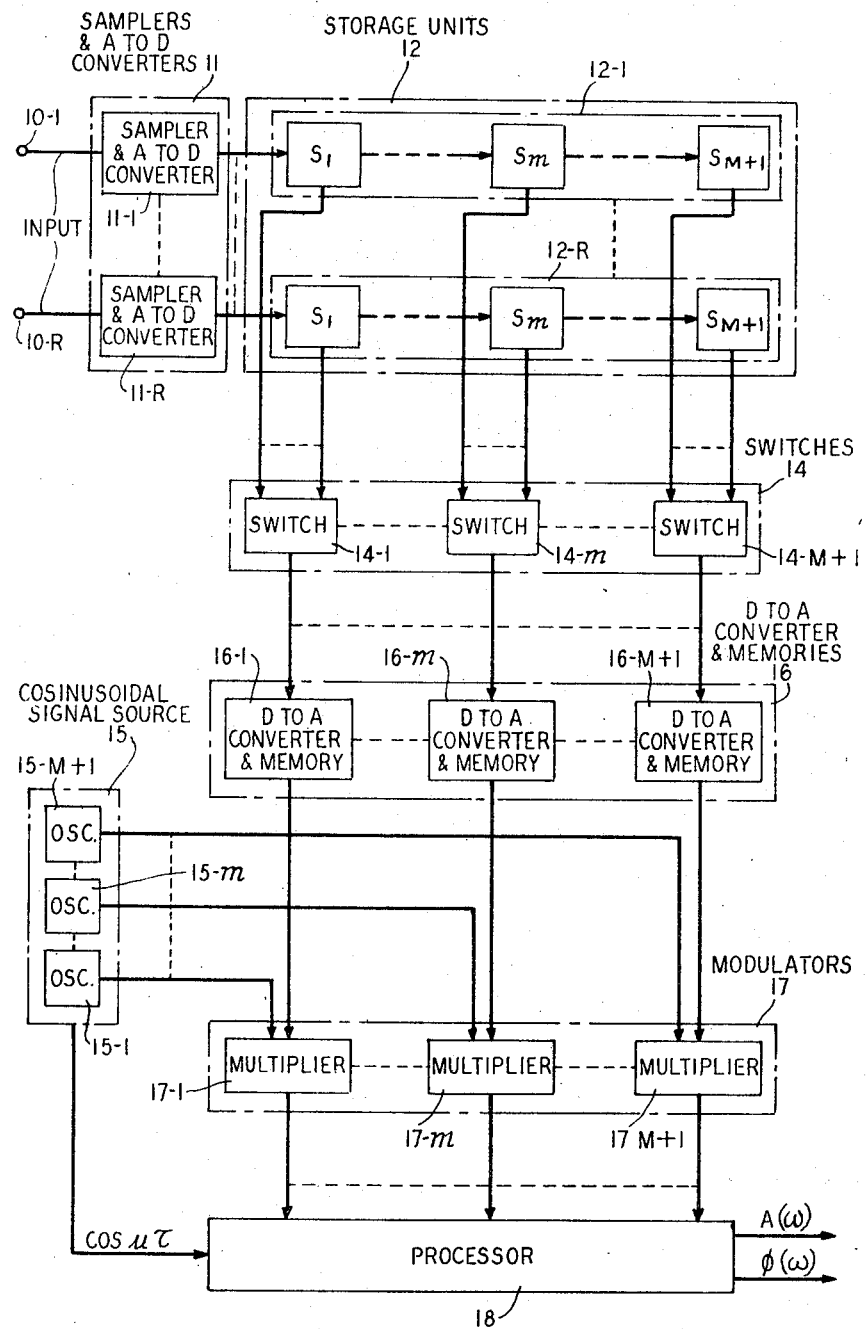
FIG. 1 is a schematic block diagram of one embodiment of this invention.

The Fourier transform $F(\omega)$ of a signal $f(t)$ is defined as $$F(\omega) = \int_{-\infty}^{\infty} f(t) e^{-j\omega t} dt \qquad (1)$$

where $\omega$=frequency, $t$=time, and $j=\sqrt{-1}$. The signal $f(t)$ can be represented as a series of samples $f^*(t)$ spaced apart in time by T, one-half the period of the highest significant frequency component in $f(t)$. Thus $$f^*(t) = \sum_{m=0}^{M} f(mT) \delta(t - mT) \qquad (2)$$

where $\delta(t-mT)$ equals the unit impulse at time $t=mT$, and $m$ is an integer used to denote the $m$th sample. M is a selected positive integer one less than the total number of samples. Combining Equations 1 and 2 and interchanging the integral and summation signs in the resulting equation, gives $$F^*(\omega) = \sum_{m=0}^{M} f(mT) \int_{-\infty}^{\infty} \delta(t - mT) e^{-j\omega t} dt \qquad (3)$$

where $F^*(\omega)$ is the Fourier transform of $f^*(t)$. But the integral in Equation 3 is just the Fourier transform of the unit impulse at time $t=mT$. Thus $$\int_{-\infty}^{\infty} \delta(t - mT) e^{-j\omega t} dt = e^{-j\omega mT} \qquad (4)$$

and Equation 3 can be written as $$F^*(\omega) = \sum_{m=0}^{M} f(mT) e^{-j\omega mT} \qquad (5)$$

Equation 5 shows that the Fourier transform of a series of samples $f^*(t)$ representing a signal $f(t)$ can be represented as the sum of the Fourier transforms of a series of impulses weighted by the amplitudes of $f(t)$ at the sampling times $mT$. By making use of the relation $$e^{-j\omega mT} = \cos \omega mT - j \sin \omega mT$$

the resulting Fourier transform can be represented as the sum of a real part $Re$ and an imaginary part $Im$. Thus $$F^*(\omega) = Re + jIm \qquad (6)$$

or $$F^*(\omega) = \sum_{m=0}^{M} f(mT) \cos \omega mT - j \sum_{m=0}^{M} f(mT) \sin \omega mT \qquad (7)$$

where $$Re = \sum_{m=0}^{M} f(mT) \cos \omega mT \qquad (8a)$$

and $$Im = -\sum_{m=0}^{M} f(mT) \sin \omega mT \qquad (8b)$$

$F^*(\omega)$ can also be written in polar notation as $$F^*(\omega) = A(\omega) e^{j\Phi(\omega)} \qquad (9)$$

where $A(\omega)$, the so-called amplitude spectrum of $F^*(\omega)$, equals $\sqrt{(Re^2 + Im^2)}$ and $\Phi(\omega)$, the so-called phase spectrum of $F^*(\omega)$, equals $\tan^{-1} Im/Re$.

Equations 8a and 8b show that the phase $\omega wT$ of the $m$th cosine and sine terms in Equations 8a and 8b varies only with frequency $\omega$. But at any given frequency $\omega_n$, the as, for example, $\cos \theta\tau$, where $\theta$ represents frequency and phase $\omega_n mT$ varies only with the sample as denoted by $m$.

Now the phase of a constant frequency cosinusoid, such $\tau$ time, varies only with time $\tau$. Therefore, by letting $\omega$ become $\tau$, and $mT$ become $m\theta + u$, where $\tau$ represents time in seconds, and $\theta$ and $u$ represent frequency in radians per second, the phase $\omega_n mT = (m\theta + u)\tau_n$ at a given time $\tau_n$, still varies only with the sample, as determined by the value of $m$. Thus, Equation 5 can be rewritten as $$F^*(\tau) = e^{-j\tau u} \sum_{m=0}^{M} f(mT) e^{-j\tau m\theta} \qquad (10)$$

Here $e^{-j\tau u}$ is a complex carrier signal with frequency $u$, chosen, for a reason explained later, to be several orders of magnitude greater than $M\theta$.

Comparing Equations 5 and 10 on a term-to-term basis shows that if $$\omega mT = \tau m\theta \qquad (11)$$

then $$F^*(\tau) = e^{-j\tau u} F^*(\omega) \qquad (12)$$

Thus, the signal $F^*(\tau)$ represents the Fourier transform $F^*(\omega)$ of the set of samples $F^*(t)$ whenever $e^{-j\tau u}$ is unity.

Equation 11 shows that $\omega_{max} T = \tau_{max} \theta$. But by definition $\omega_{max} = 2\pi f_{max}$, where $f_{max}$ is the highest significant frequency component in $f(t)$, and $T = \frac{1}{2} f_{max}$ (the well-known Nyquist sampling theorem). Thus $$-\dot{\theta} = \frac{\pi}{\tau_{max}} \text{ [cycles/second]} \qquad (13)$$

where $\tau_{max}$ is the time at which $F^*(\tau)$ equals $F^*(\omega_{max}) e^{-ju\tau_{max}}$. Equation 13 gives the surprising result that $\tau_{max}$, the time necessary to generate $F^*(\tau)$, which is related to the frequency spectrum of $f(t)$, is a function only of $\theta$ and is independent of $\omega_{max}$, the maximum significant frequency component in $f(t)$, M, the total number of samples of $f(t)$, and T, the time between contiguous samples. The smaller $\tau_{max}$ becomes, the larger must be $\theta$.

Equation 12 reveals that $F^*(\tau)$ equals $F^*(\omega)$ only when $e^{-j\tau u}$ equals unity. But $e^{-j\tau u}$ equals unity whenever the phase $\tau u$ equals $2\pi$ or an integral multiple thereof. Thus $F^*(\tau)$ equals $F^*(\omega)$, only when $$u\tau = 2\pi k, \ k = 0, 1, 2, \ldots K \qquad (14)$$

where K is a selected positive integer with a value given by $0 \leq K \leq \infty$.

Now K represents the number of times $e^{-j\tau u}$ equals unity during the sweep of $F^*(\tau)$ from $F^*(0)$ to $F^*(\tau_{max})$. Thus K represents the number of times $F^*(\tau)$ equals $F^*(\omega)$ during this sweep or equivalently, K represents the number of times $F^*(\tau)$ can be sampled to determine values of $F^*(\omega)$. If $u$ equals zero, then $F^*(\tau)$ equals $f^*(\omega)$ at all times. Likewise, if $u$ equals $\infty$ (a limiting but of course physically impossible condition), $F^*(\tau)$ again equals $F^*(\omega)$ at all times. Between these two conditions, the value of the carrier frequency $u$ is determined by the number of samples required to specify $F^*(\omega)$ with the desired accuracy.

The number of samples of $F^*(\tau)$ available to specify $F^*(\omega)$ at a given carrier frequency $u$ can be doubled by noticing that when $e^{-j\tau u}$ equals minus one, $F^*(\tau)$ equals $-F^*(\omega)$. By sampling $F^*(\tau)$ whenever $e^{-j\tau u}$ equals plus or minus one and inverting the sign of every other sample, twice as many samples of $F^*(\tau)$ are obtained, allowing more accurate interpolation of $F^*(\omega)$.

Equation 10 can be rewritten as $$F^*(\tau) = \left\{ \sum_{m=-N}^{N} f(mT) \cos (m\theta + u)\tau \right.$$

$$\left. -j \sum_{m=-N}^{N} f(mT) \sin (m\theta + u)\tau \right\} \qquad (15)$$

where $2N = M$. The values assumed by the sample index $m$ have been changed, as indicated, to shift the carrier frequency $u$ to the center of the band of frequencies occupied by the modulating signals $\cos(m\theta+u)\tau$ and $\sin(m\theta+u)\tau$.

Equation 15 shows that $F^*(\tau)$ is given by two summations: one containing amplitude modulated cosinusoidal signals and the other containing amplitude modulated sinusoidal signals. Consequently, it would appear that sources of both cosinusoidal and sinusoidal modulating signals are required to determine $F^*(\tau)$. This however, as will now be shown, is not always the case. For clarity in this analysis, the term "sinusoidal" refers to a wave described by a curve whose ordinates are proportional to the sine of the abscissa in the form $y=a \sin x$; correspondingly, the term "cosinusoidal" refers to a wave described by a curve whose ordinates are proportional to the cosine of the abscissa in the form $y=a \cos x$.

A well-known trigonometric identity shows that $\cos(\alpha-\pi/2)=\sin$. Accordingly $$\cos[(m\theta+u)\tau-\pi/2]=\sin(m\theta+u)\tau \quad (16)$$

If $u \gg N\theta$, that is, if the carrier frequency $u$ is several orders of magnitude greater than $N\theta$, then the time $\Delta\tau$ for all cosinusoidal modulating signals $\cos(m\theta+u)\tau$ to change in phase by $\pi/2$ radians is approximately equal. The $m$th cosinusoidal modulating signal shifts $-\pi/2$ radians in the time $\Delta\tau_m$ given by the equation $$\cos(m\theta+u)(\tau+\Delta\tau_m) = \cos[(m\theta+u)\tau-\pi/2] \quad (17)$$

Consequently, $$\Delta\tau_m = -\frac{\pi}{2u\left(1+\frac{m\theta}{u}\right)} \quad (18)$$

and if $N\theta/u<\epsilon$, where $\epsilon$ is arbitrarily small depending on the accuracy desired, then $$\Delta\tau_m \sim \Delta\tau = -\pi/2u \quad (19)$$

Thus, at any time $\tau$, the signal $$\sum_{m=-N}^{N} f(mT) \cos(m\theta+u)(\tau-\pi/2u)$$

which is just $$\sum_{m=-N}^{N} f(mT) \cos(m\theta+u)\tau$$

delayed by $\pi/2u$ seconds, represents the signal $$\sum_{m=-N}^{N} f(mT) \sin(m\theta+u)\tau$$

Accordingly, $F^*(\tau)$ can be determined from the sum of a selected number of cosinusoidal signals equally spaced in frequency and each modulated in amplitude by a corresponding sample of $f(t)$.

Combining Equations 9 and 12, and letting $A(\omega)$ become $A(\tau)$, gives the important result that $$F^*(\tau) = A(\tau)e^{-j(u-\Phi/\tau)\tau}$$
$$= A(\tau) \cos(u-\Phi/\tau)\tau - jA(\tau) \sin(u-\Phi/\tau)\tau \quad (20)$$

Comparing the real and imaginary parts of Equations 15 and 20 shows that $$A(\tau) \cos(u-\Phi/\tau)\tau = \sum_{m=-N}^{N} f(mT) \cos(m\theta+u)\tau \quad (21a)$$

and $$A(\tau) \sin(u-\Phi/\tau)\tau = \sum_{m=-N}^{N} f(mT) \sin(m\theta+u)\tau \quad (21b)$$

Thus, if the frequency $(u-\Phi/\tau)$ is much greater than the frequency of $A(\tau)$, then the envelope $A(\tau)$ of each summation term on the right-hand side of Equation 15 represents the amplitude spectrum of $f(t)$. These envelopes $A(\tau)$ can be obtained merely by rectifying and low pass filtering the signal representing one of these summations.

Figure 3A:
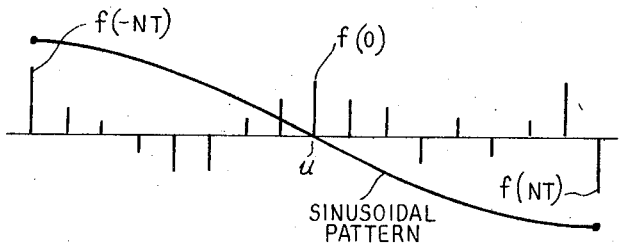
FIGS. 3A, 3B, 3C, 3D, 3E, and 3F are illustrative diagrams which aid in explaining the operation of this invention.

FIGS. 3A, 3B, 3C, 3D, 3E and 3F illustrate the operation of this invention. FIG. 3A shows a series of samples $f(-NT) \ldots f(0) \ldots f(NT)$. Superimposed on this series is one-half cycle of a sinusoid, its zero amplitude occurring at the sample $f(0)$. The pattern represented by this sinusoid is generated by taking the values of the $2N+1$ cosinusoidally varying signals, shown figuratively in FIG. 3B, at the time $\tau_2$. While only three cosinusoidally varying signals are actually shown in FIG. 3B, it is understood that $(N-1)$ cosinusoidal signals exist between the middle and the top signal and another $(N-1)$ cosinusoidal signals exist between the middle and the bottom signal. The frequency of each signal differs from the frequencies of the adjacent signals by the amount $\theta$. The top signal has a frequency $u+N\theta$; the middle or carrier signal, a frequency $u$; and the bottom signal, a frequency $u-N\theta$.

Figure 3B:
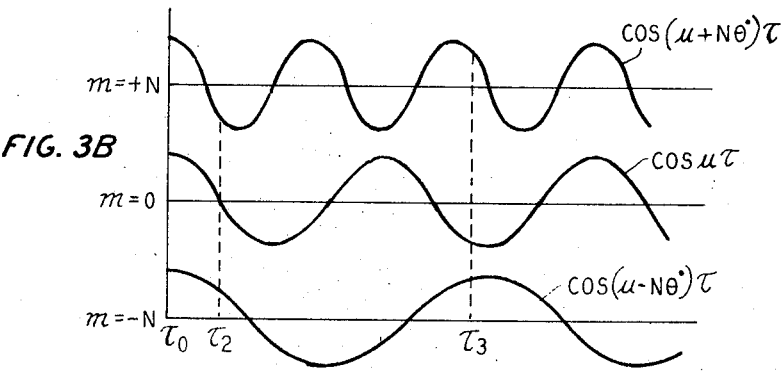

The instantaneous phase difference $2N\theta\tau$ between the top and bottom signals in FIG. 3B determines the pattern of the particular sinusoid with which the samples shown in FIG. 3A are modulated at any given instant. As time $\tau$ increases, this sinusoidal pattern changes. The number of cycles in this pattern increases from none at zero time to the number needed to match the highest frequency component in the waveform segment being analyzed at time $\tau_{max}$.

Figure 3C:
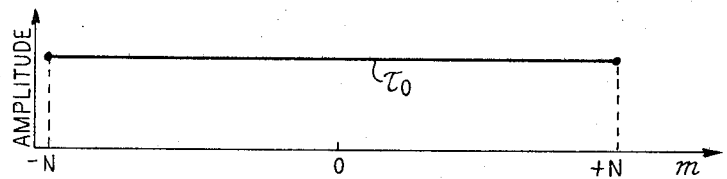
Figure 3D:
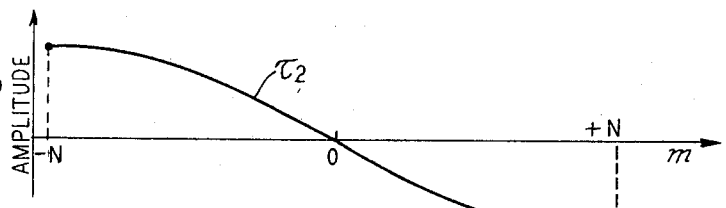

Thus, at zero time, that is, at $\tau=0$, the phase difference $2N\theta\tau=0$, and the pattern generated by the cosinusoidal signals is merely a straight line of constant amplitude as shown in FIG. 3C. Therefore, the sum of the modulated cosinusoidal signals given by the first term on the right-hand side of Equation 15 represents, at zero time, the amplitude of the D.C. component of $f(t)$.

At a later time $\tau_2$, shown in FIG. 3B, the amplitudes of the cosinusoidally varying signals trace the half cycle pattern shown in both 3D and superimposed on the samples of FIG. 3A. In general, $f(t)$ has a frequency component which also generates one-half cycle in the time $2NT$ spanned by the samples of $f(t)$. But, most likely, the one-half cycle pattern generated by the cosinusoidal signals of FIG. 3B at time $\tau_2$ will not be precisely superimposed on the frequency component of $f(t)$ which produces one-half cycle in time $2NT$. The two will be misaligned in phase. Even so, the envelope of the first term on the right-hand side of Equation 15 represents, at time $\tau_2$, the amplitude of this frequency component.

Figure 3E:
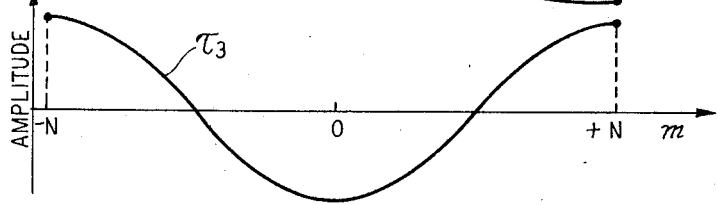

At a later time $\tau_3$, the amplitudes of the cosinusoidally varying signals trace the one cycle pattern shown in FIG. 3E. At this time, the envelope of the first term on the right-hand side of Equation 15 represents the amplitude of the component of $f(t)$ which generates one cycle in time $2NT$.

Figure 3F:
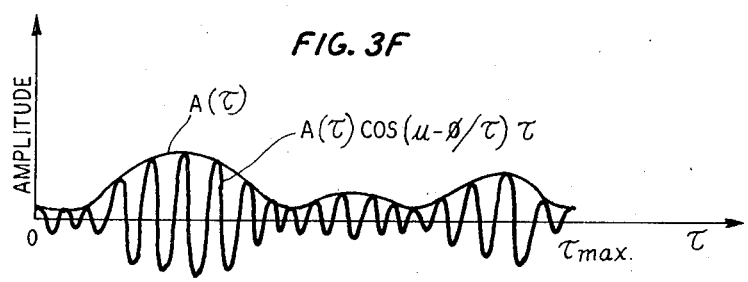

FIG. 3F shows the sum signal $A(\tau) \cos(u-\Phi/\tau)\tau$ representing the first term on the right-hand side of Equation 15. It is seen that it is quite possible for the envelope $A(\tau)$ to have a maximum even when $\cos(u-\Phi/\tau)\tau$ is zero.

DESCRIPTION OF THE EMBODIMENTS OF THE INVENTION

One embodiment of this invention is shown in FIG. 1. In this figure a plurality of R input signals are sampled in samplers 11, where R is a selected positive integer. The resulting R sets of samples are stored in storage units 12, and then transferred in sequence by switches 14 to memories 16. The samples stored in memory 16 are used to modulate, in modulator 17, a corresponding number of cosinusoids from source 15 equally spaced in frequency. The modulated cosinusoids are processed in processor 18 to obtain the amplitude and phase spectrums of the input signal segments being analyzed. Because, as shown by Equation 13, the signal processing can take place at any rate desired by appropriately selecting the frequencies of the cosinusoids from source 15, the spectrum of a given segment of an input signal can be obtained in a very short time $\tau_{max}$. This makes it possible to analyze the sampled segments from all the input signals in sequence.

In FIG. 1 a plurality of input signals, for example, acoustic signals, are detected by transducers 10–1 through 10–R. Transducers 10 convert these input signals into electrical signals which in turn are sampled by the corresponding samplers can converters 11–1 through 11–R. Each sample is then converted into a binary code word. Transducers 10 and samplers 11 are of well-known design and thus will not be described in detail.

The binary code words representing the train of samples from each sampler are then passed, in sequence, into a corresponding one of storage units 12. Unit 12–1, for example, contains a number of storage registers $S_1$ through $S_{M+1}$ where M is a selected integer and $M+1$ equals the number of samples of each signal stored. As a code word is placed in register $S_1$, the word formerly in register $S_1$ is transferred to register $S_2$. The word in register $S_2$ is transferred to register $S_3$. Similar transfer processes occur simultaneously at all registers in unit 12–1. The word in the last register $S_{M+1}$ is discarded. Thus, once an initial transition period has elapsed, unit 12–1 contains code words which represent, at any instant, the latest $M+1$ samples of the signal detected by transducer 10–1. All the other storage units 12 work in a similar manner. Storage units of the type described are well known. This invention, of course, can also operate with other types of storage units.

The code words stored in unit 12–$r$ are periodically transferred by means of switches 14–1 through 14–$(M+1)$ to memories 16–1 through 16–$(M+1)$, where $r$ is a positive integer with a value given by $1 \leq r \leq R$. Switches 14, also well known in the electronic arts, simultaneously connect the storage registers $S_1$ through $S_{M+1}$ in storage unit 12–$r$ to the corresponding memory units 16–1 through 16–$(M+1)$.

After a selected time, equal to $\tau_{max}$ in Equation 13, switches 14 disconnect the registers in unit 12–$r$ from memories 16 and connect the storage registers in the next following storage unit 12–$(r+1)$ to the corresponding memory units 16–1 through 16–$(M+1)$. At this time, the samples formerly in these memory units are discarded and replaced by the samples in storage unit 12–$(r+1)$. After the samples stored in unit 12–R are transferred to memories 16 and processed, switches 14 next connect the storage registers in unit 12–1 to the corresponding memories 16. This cycle repeats until stopped.

Memory units 16 contain digital-to-analog conversion apparatus for converting each received code word into a corresponding analog sample. Thus memories 16 contain, at any given instant, samples representing a selected one of the R input signal segments stored in storage units 12. The samples stored in memories 16 are used in multipliers 17 to modulate, as dictated by Equation 15, the amplitudes of cosine waves generated by oscillators 15. Thus the output signal from each multiplier 17 corresponds to a selected one of the terms in the first summation on the right-hand side of Equation 15. According to Equation 15, all such modulated cosine waves must be summed to provide an output signal with an amplitude which represents, at specified times, the real part of the frequency spectrum of the input signal corresponding to the samples stored in memories 16. This is done in processor 18.

Figure 4:
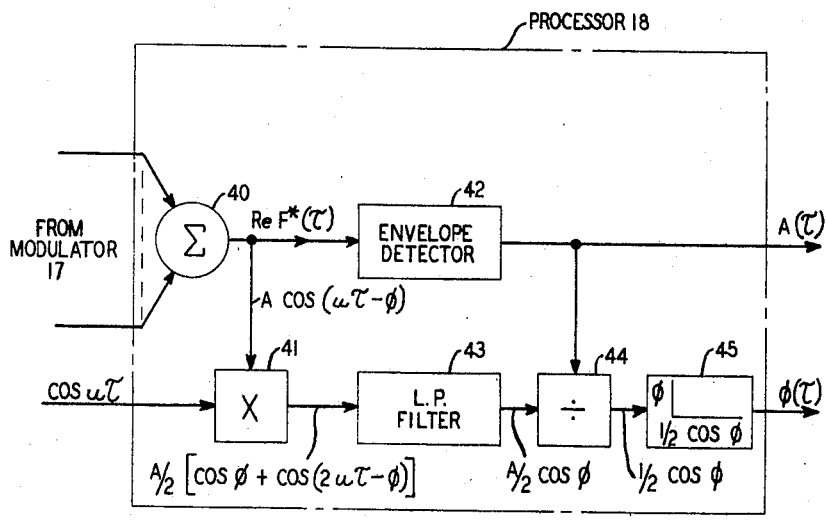
FIG. 4 shows in more detail processor 18 of FIG. 1.

Processor 18 is shown in more detail in FIG. 4. Here sum network 40 adds the modulated cosine waves from multipliers 17 (FIG. 1) to generate an output signal representing the real part of $F^*(\tau)$. As shown by Equation 21a, the envelope of this output signal represents the amplitude spectrum $A(\tau)$ of the waveform segment being analyzed. A signal representing $A(\tau)$ is obtained by envelope detecting the output signal from network 40 in detector 42 for the case where the frequency $(u-\Phi/\tau)$ is much greater than the instantaneous frequency of $A(\tau)$.

The phase spectrum $\Phi$ of the waveform segment being analyzed is obtained by modulating, in modulator 41, the output signal from network 40 with the reference carrier signal cos $u\tau$, from source 15 (FIG. 1). This modulation product is just $[A(\tau)/2][\cos \Phi + \cos (2u\tau - \Phi)]$. The high frequency term [cos $(2u\tau - \Phi)$] is removed by low pass filter 43 to leave only the term $[A(\tau)/2]$ cos $\Phi$. Envelope $A(\tau)$ is removed in dividing network 44 and the phase $\Phi$ is obtained as a function of time $\tau$ from nonlinear network 45.

Another version of processor 18 is shown in FIG. 5. Here, the output signal from summing network 40 is delayed in delay 50 to generate a signal representing the imaginary part of $F^*(\tau)$. Then the delayed and undelayed versions of the output signal from network 40 are sampled at specified times in samplers 53 and 54 to produce samples with amplitudes equal to the amplitudes of the real and imaginary parts of $F^*(\omega)$ at the frequencies $\omega$ proportional to the sampling instants.

Now Equation 12 shows that $F^*(\tau)$ equals $F^*(\omega)$ only when $e^{-j\tau u}$ equals unity; that is, when cos $\tau u$ equals one and sin $\tau u$ equals zero. Thus, the reference carrier signal cos $\tau u$, from source 15 (FIG. 1) is differentiated in differentiator 51 and the resulting signal, $-u$ sin $\tau u$, is infinitely clipped in clipper 52. The square wave produced by clipper 52 is differentiated by differentiator 55 to produce a series of pulses at the times the signal $-u$ sin $\tau u$ crosses the zero axis. The term $-u$ sin $\tau u$, of course, crosses the zero axis whenever the phase $\tau u$ equals an integral multiple of $\pi$. Half wave rectifier 58 removes the positive pulses and passes only the negative pulses in the output signal from differentiator 55. These negative pulses occur at the times the phase $\tau u$ equals integral multiples of $2\pi$. Thus the pulses from rectifier 58 occur at the times $e^{-j\tau u}$ equals one, and are used to actuate samplers 53 and 54.

The sequences of samples from samplers 53 and 54 are passed through low pass filters 56 and 57 respectively to generate continuous time varying waveforms. These waveforms, in turn, are used, in spectrum computer 59, to compute the amplitude and phase spectrums of the waveform segment being analyzed. Spectrum computer 59 is well known in the signal processing arts and thus will not be described in detail.

Figure 6:
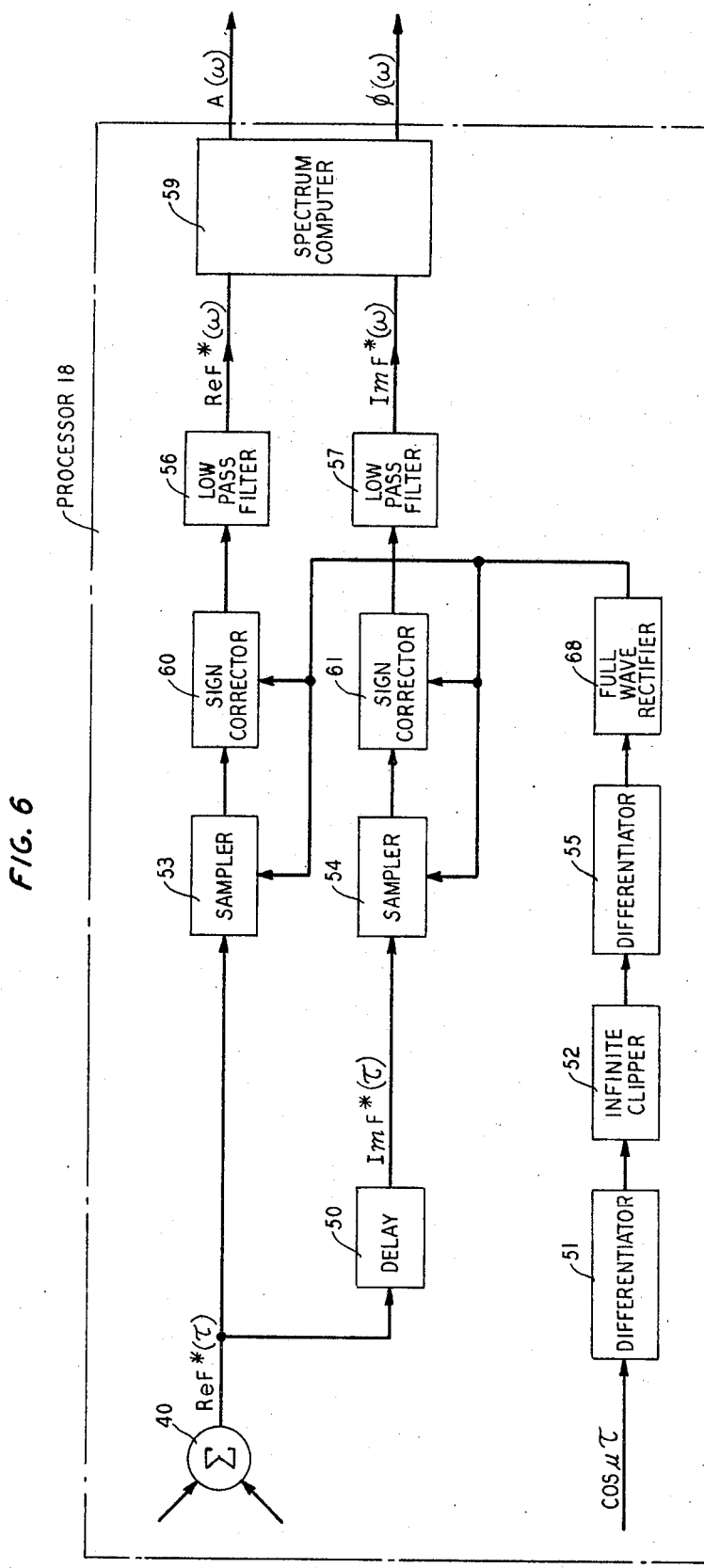

FIG. 6 shows another version of processor 18, identical to the version shown in FIG. 5 but for the substitution of full wave rectifier 68 for half wave rectifier 58 (FIG. 5) and the presence of sign correcting networks 60 and 61. The processor shown in FIG. 6 makes use of the fact that $F^*(\tau)$ equals $-F^*(\omega)$ when the phase $\tau u$ equals odd multiples of $\pi$. Thus, every zero crossing of the signal $-u$ sin $\tau u$ from differentiator 51 is converted into a pulse by clipper 52 and differentiator 55, and each pulse is passed by full wave rectifier 68. Samplers 53 and 54 are thus actuated twice as frequently to generate twice as many samples as in the processor of FIG. 5. Every other sample, however, is of the wrong polarity. Sign correcting networks 60 and 61 convert these wrong polarity samples to the correct polarity and the sequences of samples from these networks represent the real and imaginary parts, respectively, of $F^*(\omega)$. The remainder of the circuit operates in the same manner as the circuit shown in FIG. 5.

Figure 2:
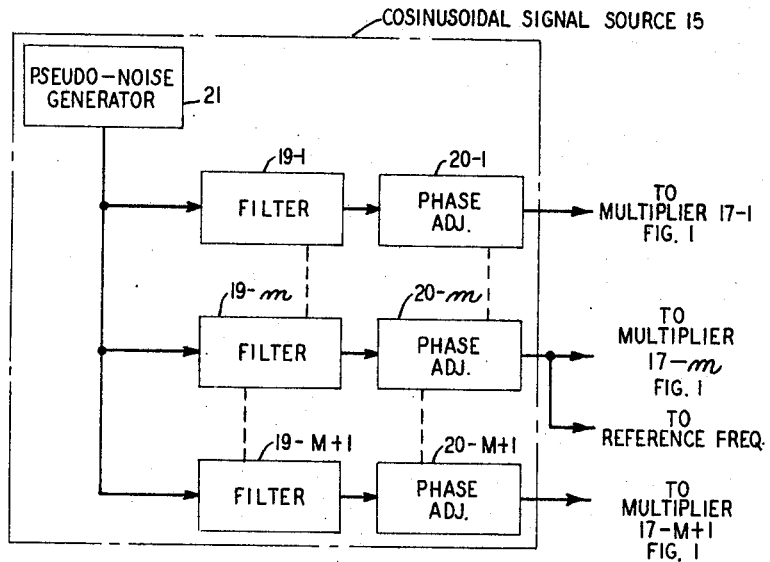
FIG. 2 is a schematic block diagram of an alternative embodiment of cosine wave signal source 15 shown in FIG. 1.

FIG. 2 shows an alternative method of generating the cosine signals used in the apparatus shown in FIG. 1. This method uses pseudonoise generator 21 in combination with filters 19 and phase adjustors 20. Pseudonoise of the type called a maximum length sequence, repetitively generated, has a frequency spectrum composed of approximately equal amplitude sinusoidal components from D.C. to a limit determined by the sequence length and driving rate. Each cosine wave component for use in a corresponding multiplier 17 (FIG. 1) is obtained by passing the pseudonoise sequence through a bandpass filter 19 with appropriate center frequency. The resulting cosine waves are adjusted in phase adjustors 20 to have a specified value at a selected time and then each cosine wave is delivered to its corresponding multiplier 17 (FIG. 1) where it is amplitude modulated.

Figure 7:
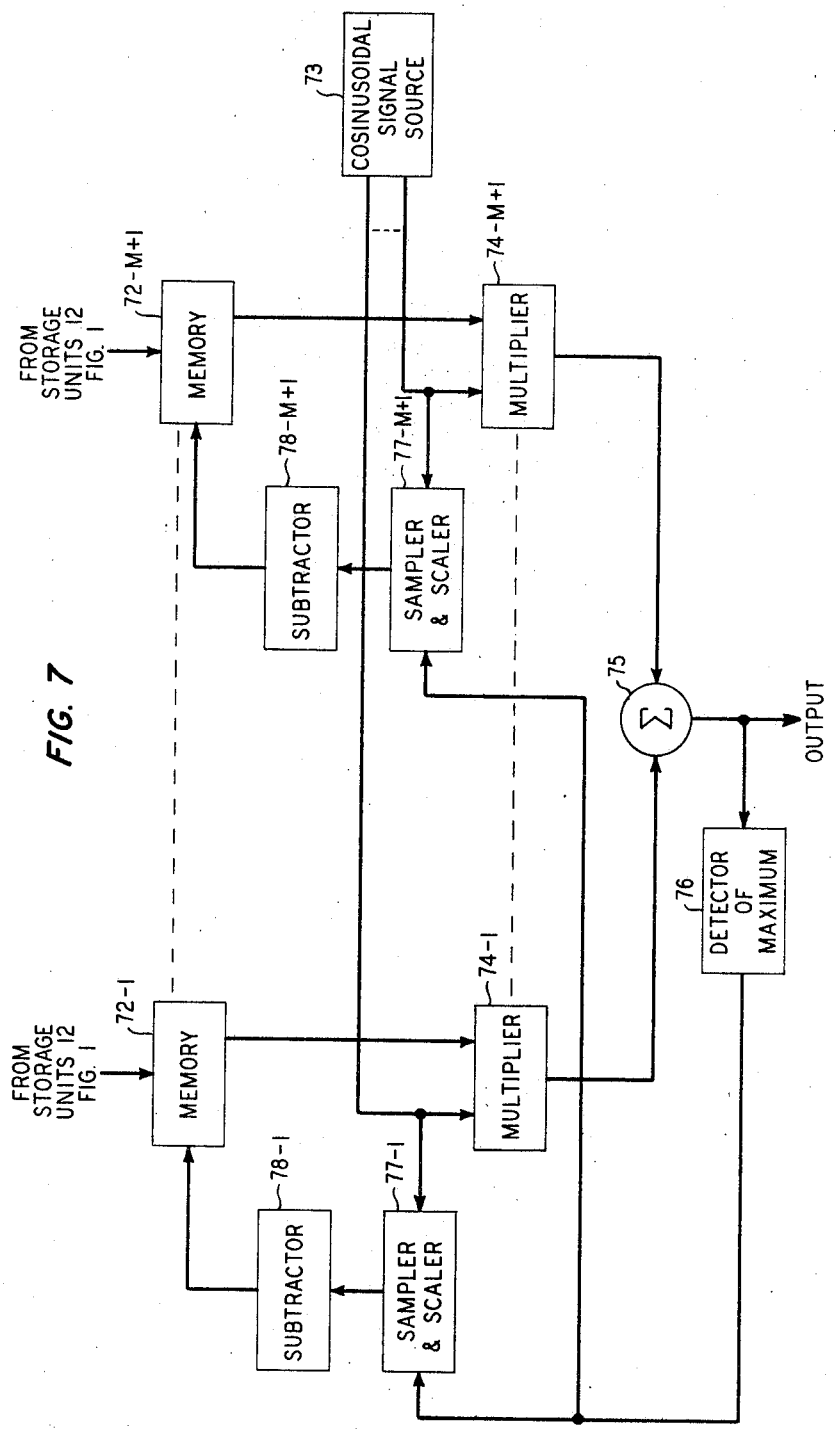
FIG. 7 is a schematic block diagram of an embodiment of this invention for subtracting selected high amplitude frequency components from a waveform segment being analyzed, and reprocessing the modified waveform segment.

FIG. 7 shows an embodiment of this invention in which high amplitude frequency components in the waveform segment being analyzed are removed to make possible the detection of adjacent small amplitude frequency components. Memories 72–1 through 72–$(M+1)$ contain the samples of the waveform segment being analyzed. These samples, derived as shown in FIG. 1, are used to amplitude modulate $M+1$ cosinusoidally varying signals derived from cosinusoidal signal source 73. The amplitude modulated cosinusoidal signals are summed in summing network 75. The output signal from network 75 has an envelope which represents the amplitude spectrum of the waveform segment being analyzed. Maximum detector 76 detects the frequency components of maximum energy in the waveform segment being analyzed. If the energy of these frequency components exceeds a selected threshold, detector 76 actuates sampling and scaling networks 77–1 through 77–$(M+1)$. Networks 77 sample the amplitudes of the cosinusoidal signals each time maximum detector 76 detects a maximum frequency component above the selected threshold in the waveform segment being analyzed. The amplitudes of these samples are scaled to correspond to the amplitude of the detected frequency component and stored with previously derived samples in subtracting networks 78–1 through 78–$(M+1)$. At the end of the spectral analysis, subtracting networks 78 subtract the scaled samples from the amplitudes of the corresponding samples stored in memories 72. The spectral analysis process is then repeated, with the maximum frequency components in the waveform segment being analyzed removed. This makes it possible to detect more easily the small amplitude frequency components in this waveform segment adjacent to these maximum frequency components.

The removal of high amplitude frequency components can be repeated several times if desired, removing frequency components of decreasing amplitude prior to each reprocessing.

Embodiments of this invention have been described using cosinusoidal modulating signals. Those skilled in the signal processing arts will recognize that, with appropriate changes in structure, sinusoidal modulating signals can be used in place of the cosinusoidal modulating signals.

What is claimed is:

1. Apparatus which comprises
    means for sampling R analog input signals, where R is a selected positive integer,
    means for converting the analog samples from said sampling means into digital samples,
    means for storing R sets of said digital samples, each set containing $M+1$ samples where M is a selected positive integer,
    means for producing $M+1$ cosinusoids selectively spaced in frequency,
    means for converting said R sets of $M+1$ digital samples into analog samples,
    means for sequentially modulating the $m$th cosinusoid with the $m$th sample in each of said R sets of samples, where $m$ assumes simultaneously all integral values given by the relation $1 \leq m \leq M+1$, and
    means for processing the $M+1$ modulated cosinusoids from said modulating means to produce, in sequence, signals representing the frequency spectrums of said R sets of samples.

2. Apparatus as in claim 1 in which said processing means comprises
    a summing network for summing the $M+1$ modulated cosinusoids from said amplitude modulating means to produce a first signal proportional to $$A \cos (\mu\tau - \Phi)$$

where A represents the amplitude spectrum of said set of samples stored in said means for converting and for storing, and $\Phi$ represents the phase spectrum of said sets of samples,
    means for multiplying said first signal by said reference cosinusoid, $\cos \mu\tau$, to produce a second signal proportional to $A/2[\cos \Phi + \cos (2\mu\tau - \Phi)]$,
    means for low pass filtering said second signal to produce a third signal proportional to $A/2 \cos \Phi$,
    means for detecting the envelope of said first signal to produce a first output signal proportional to A,
    means for dividing said third signal by said first output signal to produce a quotient signal proportional to $\frac{1}{2} \cos \Phi$, and
    means for producing from said quotient signal a second output signal proportional to $\Phi$.

3. Apparatus as in claim 1 in which said processing means comprises
    a summing network for summing the $M+1$ modulated cosinusoids from said amplitude modulating means to produce a first signal proportional to $$A \cos (\mu\tau - \Phi)$$

where A represents the amplitude spectrum of said set of samples stored in said means for converting and for storing, and $\Phi$ represents the phase spectrum of said set of samples,
    means for delaying said first signal to produce a second signal proportional to $A \sin (\mu\tau - \Phi)$,
    means for sampling said first and said second signals at the times said reference cosinusoid, $\cos \mu\tau$, equals positive unity, to produce a first and a second train of samples representing the real and imaginary parts, respectively, of the frequency spectrum of said set of samples,
    filtering means for converting said first train of samples and said second train of samples into a first and a second continuous waveform representing the real and imaginary parts, respectively, of the frequency spectrum of said set of samples, and
    means for obtaining the amplitude and phase spectrums of said set of samples from said first and second continuous waveforms.

4. Apparatus as in claim 3 in which said sampling means comprises
    means for differentiating said reference cosinusoid,
    means for clipping said differentiated reference cosinusoid to produce a square wave which changes polarity at the times said reference cosinusoid equals either positive or negative unity,
    means for differentiating said square wave to produce a sequence of pulses of alternating polarity,
    means for half wave rectifying said sequence of pulses to produce sampling pulses at the times said reference cosinusoid equals positive unity,
    first sampling means responsive to said sampling pulses for sampling said first signal to produce a first train of samples representing the real part of the frequency spectrum of said set of samples, and
    second sampling means responsive to said sampling pulses for sampling said second signal to produce a second train of samples representing the imaginary part of said frequency spectrum.

5. Apparatus as in claim 3 in which said sampling means comprises
    means for differentiating said reference cosinusoid,
    means for clipping said differentiated reference cosinusoid to produce a square wave which changes polarity at the times said reference cosinusoid equals either positive or negative unity, means for differentiating said square wave to produce a sequence of pulses of alternating polarity, means for full wave rectifying said sequence of pulses to produce sampling pulses at the times said reference cosinusoid equals either positive or negative unity, first sampling means responsive to said sampling pulses for sampling said first signal to produce a first train of samples, second sampling means responsive to said sampling pulses for sampling said second signal to produce a second train of samples, first sign correction means for inverting the polarity of every other sample in said first train of samples, and second sign correction means for inverting the polarity of every other sample in said second train of samples.

6. Apparatus which comprises

R transducers for detecting R analog signals, where R is a selected positive integer, means for sampling said R analog signals to generate R sets of $M+1$ samples each, where M is a selected positive integer, means for converting the analog samples from said sampling means into digital samples, means for storing said R sets of digital samples, means for producing $M+1$ cosinusoids selectively spaced in frequency, means for converting said R sets of digital samples into analog samples, means for modulating said $M+1$ cosinusoids with $M+1$ samples in the $r$th representing a segment of the $r$th signal, where $r$ is an integer assuming sequentially all integral values given by the relation $1 \leq r \leq R$, and means for processing said $M+1$ modulated cosinusoids to produce signals representing the frequency spectrum of said segment.

7. Apparatus as in claim 6 in which said sampling means comprises

R samplers for generating from R signals, R sets of $M+1$ samples each, where M is a selected positive integer, and R analog to digital converters for converting said R sets of $M+1$ samples each, into R sets of $M+1$ binary code words each.

8. Apparatus which comprises means for sampling a selected signal, first means for storing the last $M+1$ samples of said signal, where M is a selected positive integer, second means for storing $M+1$ contiguous samples of said signal, means for transferring $M+1$ contiguous samples from said first storing means to said second storing means, means for generating $M+1$ cosinusoids selectively spaced in frequency, means for amplitude modulating said $M+1$ cosinusoids with said $M+1$ contiguous samples stored in said second storing means, means for summing said $M+1$ amplitude modulated cosinusoids to produce a first output signal representing at selected times the real part of the frequency spectrum of the signal segment represented by said $M+1$ contiguous samples, and means for delaying said first output signal to produce a second output signal representing at said selected times the imaginary part of said frequency spectrum.

9. Apparatus which comprises means for generating R sets of $M+1$ samples each, each set representing a corresponding one of R waveform segments, where R and M are positive integers, first means for storing said R sets of $M+1$ samples each, second means for storing a selected one of said R sets, means for sequentially transferring each of said R sets of $M+1$ samples each from said first storing means to said second storing means, means for generating $M+1$ cosinusoids, $$1 \ldots m \ldots M+1$$

equally spaced in frequency, where $m$ is a positive integer with a value given by $1 \leq m \leq M+1$, means for amplitude modulating the $m$th cosinusoid with the $m$th sample in said set of $M+1$ samples stored in said second storing means, means for summing said modulated cosinusoids to produce an output signal representing at selected times the real part of the frequency spectrum of the waveform segment corresponding to said set of $M+1$ samples stored in said second storing means, and means for delaying said output signal a selected amount to produce a second output signal representing at said selected times the imaginary part of said frequency spectrum.

10. Apparatus as in claim 9 in which said generating means comprises means for repetitively producing a maximum length sequence of pseudonoise characterized by a frequency spectrum containing substantially equal amplitude harmonics of the repetition frequency, filter means for isolating each of $M+1$ selected harmonics, phase adjusting means for synchronizing the phases of said $M+1$ filtered harmonics to produce $M+1$ cosinusoids, and means for transmitting each of said $M+1$ cosinusoids to said amplitude modulating means.

11. Apparatus which comprises means for storing R sets of $M+1$ samples each, means for producing $M+1$ cosinusoids selectively spaced in frequency, means for modulating said $M+1$ cosinusoids with the samples in the $r^{th}$ set, where $r$ assumes sequentially, at selected times all integral values given by the relation $1 \leq r \leq R$, means for summing said modulated cosinusoids to produce an output signal with an envelope proportional to the amplitude spectrum of said $r^{th}$ set of samples, means for detecting those frequency components of said $r^{th}$ set of samples which possess amplitudes above a selected threshold amplitude, means generating a modified $r^{th}$ set of $M+1$ samples with said frequency components removed, means for remodulating said $M+1$ cosinusoids with the samples in said modified $r^{th}$ set, and means for summing said remodulated cosinusoids to produce an output signal with an envelope proportional to the amplitude spectrum of said modified $r^{th}$ set of samples.

12. Apparatus which comprises means for storing R sets of $M+1$ samples each, means for producing $M+1$ cosinusoids equally spaced in frequency, means for modulating said $M+1$ cosinusoids with the samples in the $r^{th}$ set of samples where $r$ assumes sequentially, at selected times, all integral values given by the relation $1 \leq r \leq R$, means for summing said modulated cosinusoids to produce an output signal with an envelope proportional to the amplitude spectrum of said $r^{th}$ set of samples means for detecting those frequency components of said $r^{th}$ set of samples which possess amplitude above a selected threshold amplitude, means for generating a modified $r^{th}$ set of $M+1$ samples with said frequency components removed, and means for restarting said modulating and said summing means so as to produce an output signal with an envelope proportional to the amplitude spectrum of said modified $r^{th}$ set of samples.

13. Apparatus which comprises

R transducers for detecting R signals where R is a selected positive integer, means for sampling said R signals to generate R sets of $M+1$ samples each, where M is a selected positive integer, means for storing said R sets of $M+1$ samples each, means for producing $M+1$ cosinusoids selectively spaced in frequency, means for modulating said $M+1$ cosinusoids with the samples in the $r^{th}$ set, said $r^{th}$ set representing a segment of the $r^{th}$ signal, where $r$ assumes sequentially, and at selected times all integral values given by the relation $1 \leq r \leq R$, means for summing said modulated cosinusoids to produce an output signal with an envelope proportional to the amplitude spectrum of said segment, means for detecting those frequency components of said segment which possess amplitudes above a selected threshold amplitude, means for generating a modified $r^{th}$ set of $M+1$ samples to represent said segment with said frequency components removed, and means for restarting said modulating and said summing means to produce an output signal with an envelope proportional to the amplitude spectrum of said segment with said frequency components removed.

14. The method which comprises sampling R analog input signals, where R is a selected positive integer, converting the analog samples generated by said sampling into digital samples, storing R sets of $M+1$ digital samples each, where M is a selected positive integer, producing $M+1$ cosinusoids selectively spaced in frequency, converting said R sets of $M+1$ digital samples into analog samples, sequentially modulating the $m^{th}$ cosinusoids with the $m^{th}$ sample in each of said R sets of samples, where $m$ assumes simultaneously all integral values given by the relation $1 \leq m \leq M+1$, and processing the $M+1$ modulated cosinusoids resulting from said modulating, to produce, in sequence, signals representing the frequency spectrums of said R sets of samples.

15. Apparatus which comprises means for delaying a narrowband signal one-quarter the period of the carrier of said narrowband signal, means for generating sample control pulses having a constant pulse repetition rate from said carrier, means, responsive to said sample control pulses, for producing samples of both said delayed and said undelayed versions of said narrowband signal, means for generating a first waveform from the samples of said undelayed narrowband signal, means for generating a second waveform from the samples of said delayed narrowband signal, and means for processing said first and second waveforms to produce a first output signal proportional to the envelope of said narrowband signal and a second output signal proportional to the phase information contained in said carrier.

16. Apparatus as in claim 15 in which said means for generating sample control pulses comprises means for differentiating said carrier to produce a first intermediate signal, means for clipping said first intermediate signal to produce a second intermediate signal, means for differentiating said second intermediate signal to produce a series of pulses of alternating polarity, and means for rectifying said pulses to produce said sample control pulses.

References Cited

UNITED STATES PATENTS

| 3,060,380 | 10/1962 | Howells et al. | 324—82 X |
|---|---|---|---|
| 3,086,172 | 4/1963 | Johnson. | |
| 3,297,951 | 1/1967 | Blasbalg. | |
| 3,334,305 | 8/1967 | Yen. | |

EDWARD E. KUBASIEWICZ, Primary Examiner